United States Patent Office 3,730,943
Patented May 1, 1973

3,730,943
STABILIZED VINYL CHLORIDE POLYMERS
Lewis B. Weisfeld, Highland Park, and Carl W. Pause, Spotswood, N.J., assignors to Cincinnati Milacron Chemicals, Inc., Reading, Ohio
No Drawing. Continuation-in-part of application Ser. No. 485,094, Sept. 3, 1965, now Patent No. 3,567,681, dated Mar. 2, 1971. This application Dec. 16, 1970, Ser. No. 98,847
Int. Cl. C08f 45/62
U.S. Cl. 260—45.75 R
9 Claims

ABSTRACT OF THE DISCLOSURE

Halogen containing resin food packaging materials are effectively stabilized with mixtures of calcium neodecanoate and zinc neodecanoate.

This invention relates to stabilized halogenated hydrocarbon resin compositions having improved properties. More particularly this invention relates to stabilized food packaging materials containing vinyl chloride as a major constituent.

This application is a continuation-in-part of our co-pending application Ser. No. 485,094 filed Sept. 3, 1965 and now Pat. No. 3,567,681.

It is well known that halogen containing hydrocarbon resins deteriorate when exposed to heat and light and require the addition of stabilizers. It is also known that, so far, no single stabilizer has been found which would satisfy all requirements. With increasing knowledge of the complexities of the stabilizer problem, more and more tailor-made stabilizer combinations are offered, whose compositions are adjusted and adapted to the specific resin blends and their manner of application.

Nonetheless, most of those combination stabilizers contain certain basic ingredients whose effectiveness has been generally recognized. One of these ingredients is represented by organometallic compounds and metal salts of carboxylic acids, which for the sake of brevity, will be called hereafter metal soaps.

It is also generally recognized that the stabilizing effect of such soaps is due essentially to the metal moiety of the soaps and that the carboxylic acid has essentially the purpose to serve as convenient transporting agent for introducing the metal into the stabilizer system provided that the carboxylic acid group has a size and configuration to render the soap compatible with the resin. However, it is well known in the art that such soaps have certain subsidiary effects which, in processing, are important. These effects include stabilizer viscosity, plasticizer compatibility with the stabilizer, plastisol viscosity, "plate-out" during processing, and film clarity after processing. The calcium and zinc salts of stearic acid are used extensively for the stabilization of polyvinyl chloride resins intended for food packaging purposes as provided for in Title 21, section 121.2566 of the Code of Federal Regulations. In addition to calcium stearate, provisions are also made for the use of calcium myristate and calcium benzoate. In addition to zinc stearate, provisions are made for use of zinc palmitate and, with limitations, zinc salicylate. The use of calcium oleate, ricinoleate and acetate as well as use of zinc resinate are additionally provided for under 21 C.F.R. 121.2001 "Substances for which prior sanctions have been granted," but all these materials comprise the sum total of carboxylic acid salts of calcium and the zinc which may be used.

In addition to these calcium and zinc salts for polyvinyl chloride resin stabilization, and fitting into this general class of stabilizers, are magnesium salicylate, magnesium stearate and stannous stearate. The use of magnesium salts (with zinc salts and polyols) is taught by U.S. Pat. No. 3,396,132.

The metal salts of oleic, ricinoleic and resinic acids are not generally used for non-toxic PVC stabilization, since they contribute to poor early color maintainance in processed film due to oxidation of olefinic material. The salicylates are very restrictive in application (rigid PVC only, no more than 0.3% based on salicylic acid), ostensibly because of some question in toxicity. Calcium acetate is not used because of resin incompatibility and lack of stabilization effect. Palmitates and myristates are very seldom used since they prove little more effective than stearates but cost more. The stearate and benzoate salts of calcium and zinc are used commercially, and stearates for the largest part.

However, calcium and zinc stearates (benzoates) have certain undesirable properties, especially as applied to rigid PVC processing. Rigid PVC bottles stabilized with these exhibit reduced clarity and, in the presence of aqueous or alcoholic aqueous food products, exhibit complete loss of transparency, sometimes called water blush. This is demonstrated by the slow development of a milky opacity.

We have discovered that the calcium and zinc salts of neodecanoic acid may be used to replace the respective salts of stearic and benzoic acids, with consequent vast improvement in both clarity and water blush. In addition, we have found these materials to be non-toxic and suitable for food-packaging applications within the context of the Code of Federal Regulations.

The neo-acids are essentially trialkyl acetic acids of the formula

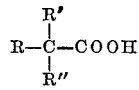

R, R', and R" being alkyl, and are prepared by reacting olefin feed streams with carbon monoxide and steam in the presence of a suitable catalyst.

Neodecanoic acid consists of a mixture of trialkyl acetic acids wherein the total number of alkyl substituent carbons adds up to or averages eight, i.e. where R', R", and R are alkyl groups totalling an average of eight carbon atoms. These groups may be methyl, ethyl, propyl, isopropyl, butyl, isobutyl, and pentyl, but only saturated alkyl hydrocarbon radicals. Further, the acid may not be merely or only C–10, but may be a mixture of C–9 thru C–11 saturated monocarboxylic acids with complete alkyl group substitution on the carbon alpha to the carboxylic acid moiety. Neodecanoic acid is currently manufactered by and commercially available from Enjay Chemical Company under the trade name "Neodecanoic Acid" and by Shell Chemical Company under the trade name "Versatic 911 Acid."

Calcium neodecanoate and zinc neodecanoate are the Group II–A Period 4 and Group II–B Period 4 metal salts of neodecanoic acid, derived from simple reaction of either metal oxide (or calcium hydroxide) with the acid. Generally, close to but less than one equivalent (two moles) of neodecanoic acid are reacted with either oxide, so each salt may be more or less close to the di(neodecanoate) structure. Both metal oxides have a tendency to "overbase," so that structures represented by hydroxy metal neodecanoate and bis (metal neodecanoate) oxide are present, as well as metal di(neodecanoate) structures. Although these overbasing effects are minimized in the case of the calcium salt (Group II–A), they are preponderant in the case of the zinc salt and all Group II–B metal salts. An attempt to prepare the zinc di(carboxylate) salt of a long chain carboxylic acid results in appreciable free acid. The correct nomenclature for these respective salts is therefore, calcium neodecanoate and zinc neodecanoate, rather than di(neodecanoate).

Preparation of calcium neodecanoate

To 35 grams of odorless mineral spirits complying with 21 C.F.R. 121.2588 was added 7.17 grams of 95% pure calcium oxide (0.1215 equivalents). To this slurry, 10.78 grams of butyl carbitol were added, then 47.05 grams of 318 A.V. neodecanoic acid (0.1333 equivalents). The reaction was exothermic, peaking at 160–170° F. The mixture was heated with agitation to 230–240° F. and the temperature maintained there for 20 to 30 minutes. The clear, homogeneous solution was cooled, analyzed, and adjusted to 4.97% (by reanalysis) calcium metal by addition of more odorless mineral spirits.

Preparation of zinc neodecanoate 62.8 grams of neodecanoic acid (324 A.V., 0.1813 equivalents) and 18.7 grams of butyl carbitol were mixed and heated to 160° F. To this, 18.5 grams of 99.5% pure zinc oxide (less than 5 p.p.m. heavy metals) was added and heating was continued to 260° F. to dehydrate the material. The clear, homogeneous solution was then cooled and analyzed, adjusted to 16.3% zinc metal with butyl carbitol.

The calcium-zinc neodecanoate stabilizer of our invention is suitable as stabilizers for halogen-containing resins approved for food packaging use by the Food and Drug Administration. Preferred resins are polyvinyl chloride, rigid and plastisol formulations, copolymers and mixtures having vinyl chloride as the major constituent. Preferred comonomers include propylene (0–10%), ethylene and vinyl acetate.

The calcium neodecanoate and zinc neodecanoate salts are introduced into the resin as the above solutions or as the neat salts at levels preferably not exceeding 0.2 percent of calcium as metal and preferably not exceeding 0.3 percent of zinc as metal based on 100 percent of the resin. Alternatively, they may be introduced as the binary complex calcium-zinc neodecanoate, at the same levels as those above.

The mixture consisting of calcium neodecanoate and zinc neodecanoate, with or without volatile solvents as a carrier and complying with the Code of Federal Regulations, is intended for use as a stabilizer in plastisol formulations comprising polyvinyl chloride and/or its copolymers wherein vinyl chloride is the major monomer and unplasticized polyvinyl chloride plastics used in the fabrication of plastic films and articles for food-contact purposes. No more of either metal salt should be used than that which will confer the necessary processing (thermal) stabilization to the manufactured article. Since both salts approximate the di(neodecanoate) stoichiometry, the contents of respective salts in 100 parts of the polyvinyl chloride resin can be calculated as $$\text{Calcium neodecanoate} = 0.157 \frac{382.6}{40.08} = 1.5 \text{ parts}$$

$$\text{Zinc neodecanoate} = 0.240 \frac{407.9}{65.37} = 1.5 \text{ parts}$$

For the present experiments, the respective calcium and zinc neodecanoate salt solutions were introduced in the polyvinyl chloride plastic composition in the amounts noted above, by simple compounding in a Hobart mixer. The pasty composition was then processed on a hot two-roll mill at 350° F. for 5 minutes, sheeted out, then cut and press polished into 6.0" x 6.0" x 0.125" plaques. During this time the solvents (butyl carbitol and Odorless Mineral Spirits) evaporated. The ultimate composition of the polyvinyl chloride plastic sheets used in the subsequent extraction work was

|  | Parts |
|---|---|
| PVC homopolymer | 100.0 |
| Dioctyl phthalate | 45.0 |
| Exoxidized soy bean oil (as 121.2001) | 5.0 |
| Calcium neodecanoate (as salt) | 1.5 |
| Zinc neodecanoate (as salt) | 1.5 |
| Total | 153.0 |

Toxicity

Since both calcium and zinc salts of neodecanoate acid are converted to the calcium and zinc chloride immediately on contact with stomach acids, sub-acute toxicity tests were preformed on the neodecanoic acid, the only new material of undefined toxicity.

A ninety-day feeding test was performed in rats at several dietary levels. Histopathological examination of animals slaughtered revealed that 500 p.p.m. was a clear "no-effect" level. Slight involvement was shown at 1500 p.p.m., the next highest dietary level.

A similar 90-day feeding test was carried out using dogs. Analysis showed 9.45 mg./kg./day to be a clear "no-effect" dosage, and possibly even 30 mg./kg./day. The beginnings of apparent compound-related effects were not observed until about 95 mg./kg./day.

Example I

To demonstrate the improved clarity, calcium neodecanoate was compared with calcium benzoate and calcium stearate in the following formulation:

|  | Parts |
|---|---|
| Polyvinyl chloride homopolymer | 100.0 |
| Dioctyl phthalate | 45.0 |
| Epoxidized soya oil | 5.0 |
| Zinc stearate (10.7% Zn) | 1.0 |
| Calcium, as indicated. | |

Three systems containing the formulation noted above and one of the calcium salts in the following amounts were tested.

| System | Salt | Percent Ca metal | Parts used |
|---|---|---|---|
| 1 | Stearate | 6.5 | 2.00 |
| 2 | Benzoate | 14.2 | 0.92 |
| 3 | Neodecanoate (Example 1) | 4.97 | 2.62 |

The three systems were blended in a Hobart mixer and sheeted on a two roll mill for 5 minutes at 320° F. Portions of the sheet were pressed polished into 6" x 6" x 0.125" plaques and compared for clarity. The system containing calcium stearate had milkiness against a black background, the calcium benzoate containing system had less milkiness and the calcium neodecanoate system was substantially better and almost clear.

Other portions of the milled sheets were heat aged at 350° F. in a circulating air oven, with samples removed every ten minutes. The rate of color development and the total heat stability to black decomposition was substantially the same for all systems.

The experiment was repeated using the same formulation but 0.66 part zinc neodecanoate was substituted for the zinc stearate.

EXAMPLE II

To demonstrate the improved clarity, zinc neodecanoate was compared with zinc stearate in the following formulation:

|  | Parts |
|---|---|
| Polyvinyl chloride homopolymer | 100.0 |
| Dioctyl phthalate | 45.0 |
| Epoxidized soya oil | 5.0 |
| Zinc neodecanoate (16.3% Zn) | 0.66 |
| Calcium salt, as indicated. | |

The three systems containing the formulation noted above and one of the calcium salts in the following amounts were tested.

| System | Salt | Percent Ca metal | Parts used |
| --- | --- | --- | --- |
| 4 | Stearate | 6.5 | 2.00 |
| 5 | Benzoate | 14.2 | 0.92 |
| 6 | Neodecanoate (Example 1) | 4.97 | 2.62 |

The three systems were blended in a Hobart mixer and sheeted on a two roll mill for 5 minutes at 320° F. Portions of the sheet were pressed polished into 6" x 6" x 0.125" plaques and compared for clarity. System 4, containing zinc neodecanoate and calcium stearate, appeared clearer than the all stearate system (No. 1) but more opaque or milky than system number 3, the zinc stearate/calcium neodecanoate stabilized system. System number 6, the all neodecanoate system was marginally clearer than system 3. System number 5, the calcium benzoate/zinc neodecanoate system, appeared marginally clearer than system number 2, the calcium benzoate/zinc stearate system.

It would appear from these results that calcium neodecanoate provides the major effect in clarification; but the zinc neodecanoate does contribute a significant technical improvement. This is probably because calcium stearate and benzoate opacify the composition much more than zinc stearate.

Migration

Plaques of calcium and zinc neodecanoate stabilized PVC composition were prepared in 6" x 6" x 0.125 squares according to the method of Example I and II. The formulations were based on the following composition:

| | Parts |
| --- | --- |
| PVC homopolymer | 100.0 |
| Dioctyl phthalate | 45.0 |
| Epoxidized soy bean oil | 5.0 |
| Calcium neodecanoate (as salt) | 1.5 |
| Zinc neodecanoate (as salt) | 1.5 |

Alternatively, these salts were used at levels of 3.16 parts per hundred of the calcium neodecanoate solution and 1.47 parts per hundred of the zinc neodecanoate solution. Extraction experiments were performed to equilibrium in four food-simulating solvents: water, 3% acetic acid, 8% ethanol/water and ne-heptane.

In water, the sum of the weights of theoretical calcium di(neodecanoate) and zinc di(neodecanoate is almost equal to the total residue extracted, indicating that these salts are the major components migrating from the polyvinyl chloride sheet. No more than 22 p.p.m. of calcium [210 p.p.m. of theoretical calcium di(neodecanoate)] and no more than 5 to 8 p.p.m. [30 to 50 p.p.m. of theoretical zinc di(neodecanoate)] migration.

In 3% acetic acid, the sum of the weights of the theoretical di(neodecanoate) soaps appear to exceed the total residue for early experiments. This would be anticipated because of metal acetate formation (greater solubility) within and outside the film. Also, acetic acid is a stronger acid than neodecanoic.

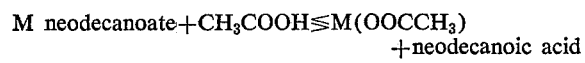

$$M \text{ neodecanoate} + CH_3COOH \leqq M(OOCCH_3)$$
$$+ \text{neodecanoic acid}$$

However, equilibrium appears to be rapidly reached and the amount of calcium extracted does not exceed 4 p.p.m. (37 p.p.m. of theoretical di-neodecanoate soap) and zinc does not exceed 4.5 p.p.m. (28 p.p.m. of theoretical di-neodecanoate soap).

In 8% aqueous ethanol solution, the amount of residue is in excess of calcium and zinc neodecanoate extracted, indicating some plasticizer migration. Calcium migrating does not exceed 40 p.p.m. (382 of theoretical di-neodecanoate soap) and zinc migrating does not exceed 7 p.p.m. (44 p.p.m. of theoretical di-neodecanoate soap).

There appears to be a tendency for acetic acid to suppress migration and for ethyl alcohol to increase it somewhat.

In n-heptane, the total residue far exceeded the amount calcium and zinc salts extracted, as plasticizer migration would be considered more likely here. Proportionate migration of the zinc component increases (as would be anticipated for the greater solubility of the less ionic Group II–B metal soap), but calcium migration did not exceed 22 p.p.m. (210 p.p.m. theoretical soap) and zinc migration did not exceed 20 p.p.m. (125 p.p.m. theoretical soap).

In summary then, calcium neodecanoate migration cannot be expected to exceed 380 p.p.m. (40 p.p.m. Ca as metal) and zinc neodecanoate migration cannot be expected to exceed 125 p.p.m. (20 p.p.m. Zn as metal).

These migration levels are low enough to be safely supported by the toxicity results reported above.

EXAMPLE III

A mixed calcium-zinc neodecanoate soap was prepared containing 3.54% calcium (as metal) and 10.61% zinc (as metal). Analogously, a mixture of calcium stearate (6.5% Ca) and zinc stearate (11.7%) was prepared in a salt proportion of 37.4% calcium stearate and 62.6% zinc stearate.

An amount equal to 0.515 parts of the calcium-zinc neodecanoate mixed soaps and, separately, 0.75 parts of the calcium-zinc stearate mixed soaps were blended with the following formulation:

| | Phr. |
| --- | --- |
| Vinyl chloride-propylene copolymer | 100 |
| Epoxidized soy bean oil | 2.5 |
| Methylmethacrylate/butadiene/styrene terpolymer (Impact Modifier) | 5.25 |
| Ethylene bis (stearamide) | 0.5 |
| Stabilizer, as above. | |

These materials were processed on a two-roll mill for 5 minutes at 350° F., sheeted out, and press polished into 6" x 6" x 0.125" rigid plaques. The clarity of the all neodecanoate system was superior to the all stearate system, but they were both nonetheless relatively clear. These plaques were placed in water jars, the jars placed in an oven at 50° F. for one week, and evaporated water was replaced every day. At the end of this time, the stearate stabilized plaques had become appreciably more opaque than the neodecanoate plaques. When the plaques were removed and allowed to dry at room temperature (ambient humidity), they went back to their original state of clarity within several days time.

What is claimed is:

1. A resin composition having improved clarity and resistance to water-blush suitable for use in contact with food products comprising a vinyl chloride polymer and a stabilizing effective amount of a mixture consisting of calcium neodecanoate and zinc neodecanoate, said calcium neodecanoate being present in an amount not exceeding 0.5 weight percent based on the resin calculated as calcium metal, and said zinc neodecanoate being present in an amount not exceeding 0.5 weight percent based on the resin calculated as zinc metal.

2. The resin composition of claim 1 wherein said vinyl chloride polymer is polyvinyl chloride.

3. The resin composition of claim 1 wherein said vinyl chloride polymer is a copolymer of vinyl chloride and propylene.

4. The resin composition of claim 1 wherein said vinyl chloride polymer is a copolymer of vinyl chloride and ethylene.

5. The resin composition of claim 1 wherein the mixture is a solution.

6. The resin composition of claim 1 wherein the mixture is in the form of a double salt.

7. The resin composition of claim 2 wherein the amount of Ca is about 0.01 to about 0.5 weight percent and the amount of zinc is about 0.01 to about 0.5 weight percent.

8. The resin composition of claim 3 wherein the amount of Ca is about 0.01 to about 0.5 weight percent and the amount of zinc is about 0.01 to about 0.5 weight percent.

9. The resin composition of claim 6 wherein the amount of calcium is about 0.13 weight percent and the amount of zinc is about 0.11 weight percent.

References Cited

UNITED STATES PATENTS

| | | | |
|---|---|---|---|
| 2,510,035 | 5/1950 | Mack | 260—45.85 |
| 2,997,454 | 8/1961 | Leistner et al. | 260—45.7 |

OTHER REFERENCES

British Plastics—May 1954, pp. 176 to 179, article "Stabilizers for Vinyl Polymers" by V. Smith Enjay, Technical Bulletin D-27, 1963, pp. 1 and 7.

M. J. WELSH, Primary Examiner

V. P. HOKE, Assistant Examiner

U.S. Cl. X.R.

99—171 LP, 181 R; 260—45.85 R